United States Patent
Muto (10) Patent No.: US 11,728,727 B2
(45) Date of Patent: Aug. 15, 2023

(54) CHARGE PUMP

(71) Applicant: Murata Manufacturing Co., Ltd., Nagaokakyo (JP)

(72) Inventor: Takami Muto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/747,077

(22) Filed: May 18, 2022

(65) Prior Publication Data

US 2022/0393580 A1 Dec. 8, 2022

(30) Foreign Application Priority Data

Jun. 2, 2021 (JP) .................................. 2021-093076

(51) Int. Cl.
*H02M 3/07* (2006.01)
*H02M 1/34* (2007.01)

(52) U.S. Cl.
CPC ............. *H02M 3/07* (2013.01); *H02M 1/346* (2021.05)

(58) Field of Classification Search
None
See application file for complete search history.

(56) References Cited

U.S. PATENT DOCUMENTS 10,693,368 B2 * 6/2020 Yu ........................... H02M 3/07
2011/0133821 A1 6/2011 Honda

FOREIGN PATENT DOCUMENTS

JP 2011-120407 A 6/2011

* cited by examiner

*Primary Examiner* — Jeffery S Zweizig
(74) *Attorney, Agent, or Firm* — Keating & Bennett, LLP (57) ABSTRACT

A charge pump includes a first-stage switch, intermediate-stage switches, and a final-stage switch sequentially connected in series to a power line from an input terminal side. A snubber circuit is connected to the intermediate-stage switch. The snubber circuit includes a capacitor and first and second diodes. The capacitor is connected in series to the first diode and the series circuit of the capacitor and the first diode is connected in parallel to the intermediate-stage switch. The cathode of the second diode is connected to a node between the capacitor and the first diode and the anode of the second diode is connected to output terminal.

12 Claims, 14 Drawing Sheets

|     | Q01 | Q02 | Q03 | Q04 |
|-----|-----|-----|-----|-----|
| ST1 | ON  | OFF | ON  | OFF |
| ST2 | OFF | ON  | OFF | ON  |

|     | Q11 | Q12 |
|-----|-----|-----|
| ST1 | ON  | OFF |
| ST2 | OFF | ON  |

|     | Q21 | Q22 |
|-----|-----|-----|
| ST1 | OFF | ON  |
| ST2 | ON  | OFF |

|     | Q31 | Q32 |
|-----|-----|-----|
| ST1 | ON  | OFF |
| ST2 | OFF | ON  |

CHARGE PUMP

CROSS REFERENCE TO RELATED APPLICATIONS

This application claims the benefit of priority to Japanese Patent Application No. 2021-093076 filed on Jun. 2, 2021. The entire contents of this application are hereby incorporated herein by reference.

BACKGROUND OF THE INVENTION

1. Field of the Invention

The present invention relates to a charge pump that increases direct-current voltage.

2. Description of the Related Art

Japanese Unexamined Patent Application Publication No. 2011-120407 describes a multi-stage charge pump circuit. The charge pump circuit in the related art, such as the one described in Japanese Unexamined Patent Application Publication No. 2011-120407, includes multiple capacitors and multiple switches.

The multiple capacitors are connected in parallel to each other between a power line and a ground line (ground potential). The multiple switches vary a current path through a switching operation to switch between charge into and discharge from the multiple capacitors.

However, with the charge pump circuit in the related art described in Japanese Unexamined Patent Application Publication No. 2011-120407, it is difficult to suppress surge voltage occurring during the switching operation.

SUMMARY OF THE INVENTION

Preferred embodiments of the present invention provide charge pumps that each reduce or prevent surge voltage during a switching operation.

A charge pump according to a preferred embodiment of the present invention includes a first-stage capacitor, an intermediate-stage capacitor, a final-stage capacitor, a first-stage switch, an intermediate-stage switch, a final-stage switch, a first-stage switching circuit, an intermediate-stage switching circuit, a final-stage switching circuit, and a snubber circuit.

The first-stage capacitor, the intermediate-stage capacitor, and the final-stage capacitor are sequentially connected in parallel to each other between a power line and a ground line from an input terminal side to an output terminal side. The first-stage switch is connected between a node of the first-stage capacitor at the power line side and the input terminal. The intermediate-stage switch is connected between the node of the first-stage capacitor at the power line side and a node of the intermediate-stage capacitor at the power line side. The final-stage switch is connected between the node of the intermediate-stage capacitor at the power line side and a node of the final-stage capacitor at the power line side.

The first-stage switching circuit switches between a state in which the first-stage capacitor is connected to the ground line and a state in which the first-stage capacitor is connected to the output terminal. The intermediate-stage switching circuit switches between a state in which the intermediate-stage capacitor is connected to the ground line and a state in which the intermediate-stage capacitor is connected to the output terminal. The final-stage switching circuit switches between a state in which the final-stage capacitor is connected to the ground line and a state in which the final-stage capacitor is connected to the output terminal. The snubber circuit is connected in parallel to the intermediate-stage switch, includes a snubber circuit capacitor including one end connected to the input terminal side of the intermediate-stage switch, and circulates surge caused by a switching operation of the intermediate-stage switch via the snubber circuit capacitor.

With the above-described configuration, surge current caused by the switching operation of the intermediate-stage switch flows through the snubber circuit capacitor due to the presence of the snubber circuit. Accordingly, surge voltage is reduced or prevented.

According to preferred embodiments of the present invention, it is possible to reduce or prevent the surge voltage during the switching operation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings.

First Preferred Embodiment

Figure 1:
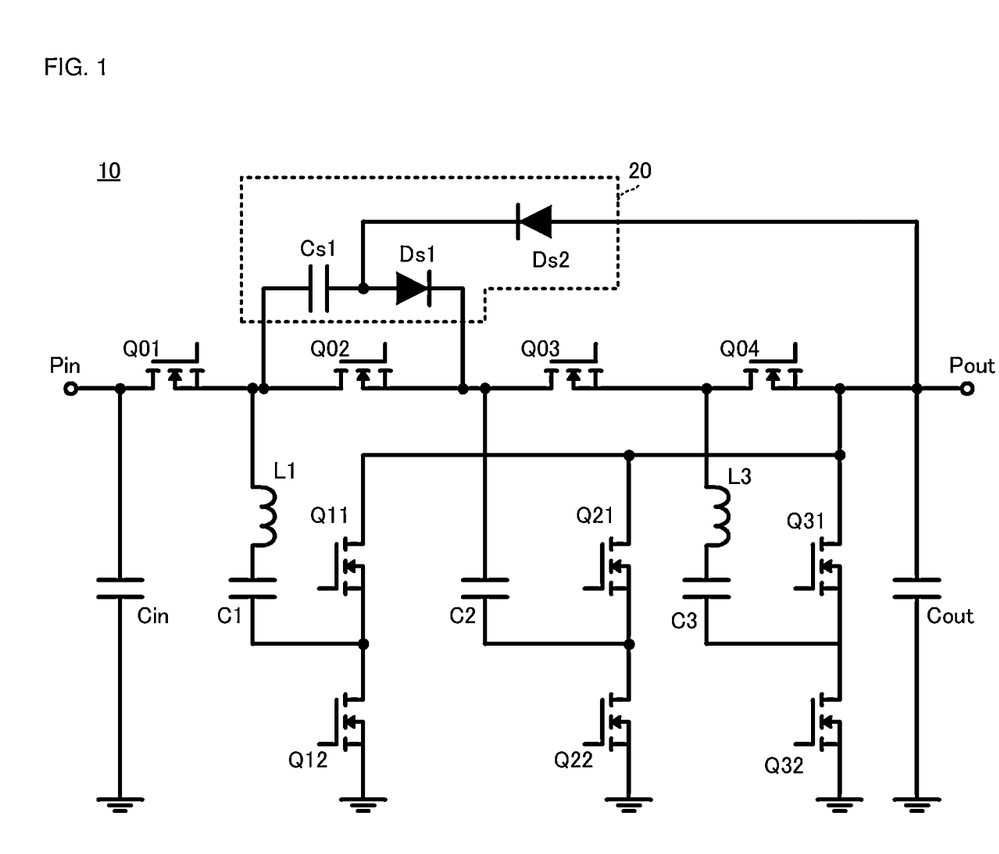
FIG. 1 is a circuit diagram of a charge pump according to a first preferred embodiment of the present invention.

A charge pump according to a first preferred embodiment of the present invention will now be described with reference to the drawings. FIG. 1 is a circuit diagram of the charge pump according to the first preferred embodiment.

Referring to FIG. 1, a charge pump 10 includes multiple switches Q01, Q02, Q03, Q04, Q11, Q12, Q21, Q22, Q31, and Q32, multiple capacitors C1, C2, C3, Cin, and Cout, multiple inductors L1 and L3, and a snubber circuit 20. The charge pump 10 includes a switching integrated circuit (IC) that generates a control signal used to switch control of the multiple switches Q01, Q02, Q03, Q04, Q11, Q12, Q21, Q22, Q31, and Q32. The switching IC is not illustrated in FIG. 1.

Each of the multiple switches Q01, Q02, Q03, Q04, Q11, Q12, Q21, Q22, Q31, and Q32 is, for example, a field effect transistor (FET).

The multiple switches Q01, Q02, Q03, and Q04 are connected in this order to a power line with which an input terminal Pin of the charge pump 10 is connected to an output terminal Pout thereof. The switch Q01 corresponds to a "first-stage switch", the switches Q02 and Q03 correspond to "intermediate-stage switches", and the switch Q04 corresponds to a "final-stage switch".

More specifically, the drain of the switch Q01 is connected to the input terminal Pin. The source of the switch Q01 is connected to the drain of the switch Q02. The source of the switch Q02 is connected to the drain of the switch Q03. The source of the switch Q03 is connected to the drain of the switch Q04. The source of the switch Q04 is connected to the output terminal Pout.

The capacitor Cin is connected between a node between the input terminal Pin and the switch Q01 and ground potential (a ground line).

One end of the capacitor C1 is connected to a node between the switch Q01 and the switch Q02 via the inductor L1. The other end of the capacitor C1 is connected to the output terminal Pout and the ground potential (the ground line) via a switching circuit including the switch Q11 and the switch Q12. The capacitor C1 corresponds to a "first-stage capacitor" and the switching circuit including the switch Q11 and the switch Q12 corresponds to a "first-stage switching circuit".

As a more specific connection configuration, the source of the switch Q11 is connected to the drain of the switch Q12 and a node between the switch Q11 and the switch Q12 is connected to the other end of the capacitor C1. The drain of the switch Q11 is connected to the output terminal Pout and the source of the switch Q12 is connected to the ground potential (the ground line).

One end of the capacitor C2 is connected to a node between the switch Q02 and the switch Q03. The other end of the capacitor C2 is connected to the output terminal Pout and the ground potential (the ground line) via a switching circuit including the switch Q21 and the switch Q22. The capacitor C2 corresponds to an "intermediate-stage capacitor" and the switching circuit including the switch Q21 and the switch Q22 corresponds to an "intermediate-stage switching circuit".

As a more specific connection configuration, the source of the switch Q21 is connected to the drain of the switch Q22 and a node between the switch Q21 and the switch Q22 is connected to the other end of the capacitor C2. The drain of the switch Q21 is connected to the output terminal Pout and the source of the switch Q22 is connected to the ground potential (the ground line).

One end of the capacitor C3 is connected to a node between the switch Q03 and the switch Q04. The other end of the capacitor C3 is connected to the output terminal Pout and the ground potential (the ground line) via a switching circuit including the switch Q31 and the switch Q32. The capacitor C3 corresponds to the "intermediate-stage capacitor" and the switching circuit including the switch Q31 and the switch Q32 corresponds to the "intermediate-stage switching circuit".

As a more specific connection configuration, the source of the switch Q31 is connected to the drain of the switch Q32 and a node between the switch Q31 and the switch Q32 is connected to the other end of the capacitor C3. The drain of the switch Q31 is connected to the output terminal Pout and the source of the switch Q32 is connected to the ground potential (the ground line).

The snubber circuit 20 includes a capacitor Cs1, a diode Ds1, and a diode Ds2. The capacitor Cs1 corresponds to a "snubber circuit capacitor", the diode Ds1 corresponds to a "first rectifier", and the diode Ds2 corresponds to a "second rectifier".

The capacitor Cs1 is connected in series to the diode Ds1. The series circuit of the capacitor Cs1 and the diode Ds1 is connected in parallel to the switch Q02.

As a more specific connection configuration, one end of the capacitor Cs1 is connected to the node between the switch Q01 and the switch Q02. The other end of the capacitor Cs1 is connected to the anode of the diode Ds1. The cathode of the diode Ds1 is connected to the node between the switch Q02 and the switch Q03 (the output terminal Pout side of the switch Q02).

The cathode of the diode Ds2 is connected to a node (a node-in-snubber circuit) between the capacitor Cs1 and the diode Ds1. The anode of the diode Ds2 is connected to the output terminal Pout.

Figure 2:
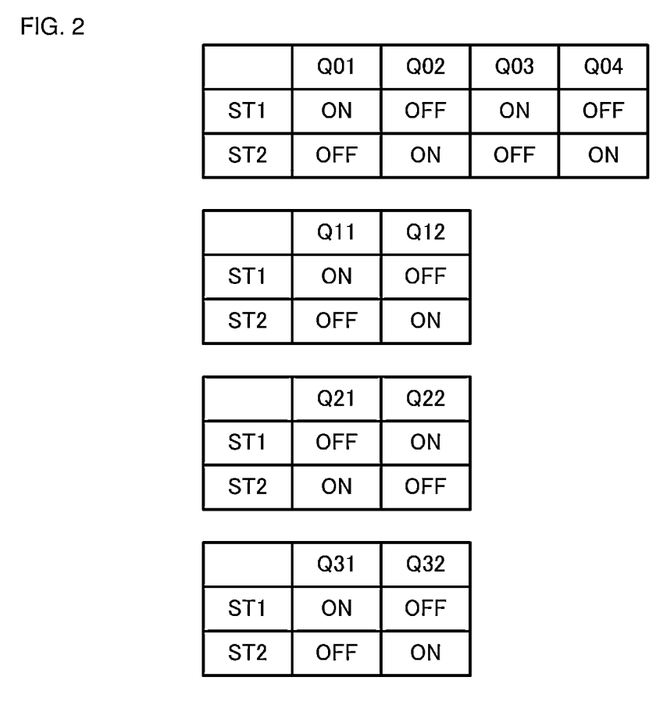
FIG. 2 is a table indicating the states of multiple switches in switching control of the charge pump.

In the above circuit configuration, the switching IC (not illustrated) performs the switching control illustrated in FIG. 2. FIG. 2 is a table indicating the states of the multiple switches in the switching control of the charge pump.

As illustrated in FIG. 2, the switching IC controls a state 1 (ST1) and a state 2 (ST2). In addition, the switching IC repeats the state 1 (ST1) and the state 2 (ST2) with a predetermined control period. "ON" in FIG. 2 indicates connection control between the source and the drain of the switch and "OFF" in FIG. 2 indicates open control between the source and the drain of the switch.

In the state 1, the switches Q01 and Q03 are set to the ON state and the switches Q02 and Q04 are set to the OFF state. In synchronization with this, the switches Q11, Q22, and Q31 are set to the ON state and the switches Q12, Q21, and Q32 are set to the OFF state.

Accordingly, in the state 1, the capacitors C1, C2, and C3 are charged with input voltage Vin from an external power supply connected to the input terminal Pin. In the state 2, the capacitors C1, C2, and C3 are discharged and voltages of the multiple capacitors C1, C2, and C3 are added. As a result, the added voltages including a voltage between both ends of the capacitor Cout and a voltage between both ends of the capacitor Cout, are output from the output terminal Pout as output voltage Vout. The charge pump 10 is capable of achieving the desired output voltage Vout through this operation.

Flow of Surge Current

Figure 3:
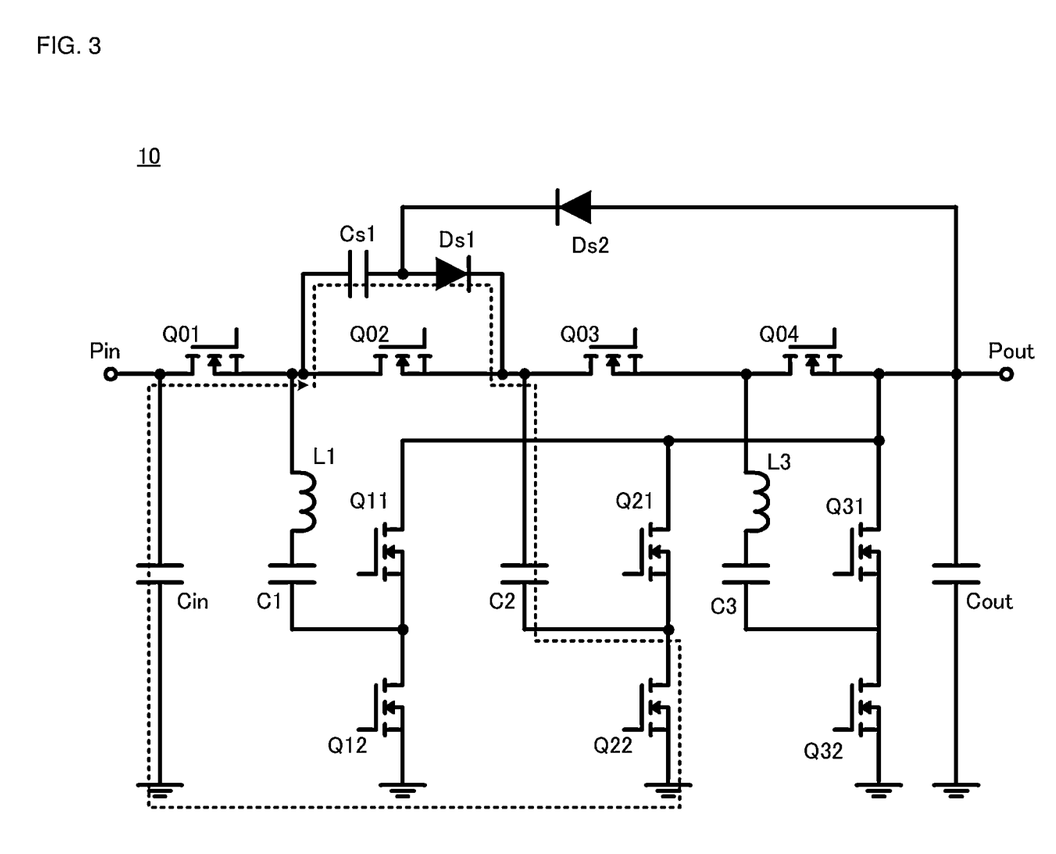
FIG. 3 is a diagram illustrating the flow of surge current in a state 1 of the charge pump in the first preferred embodiment of the present invention.
Figure 4:
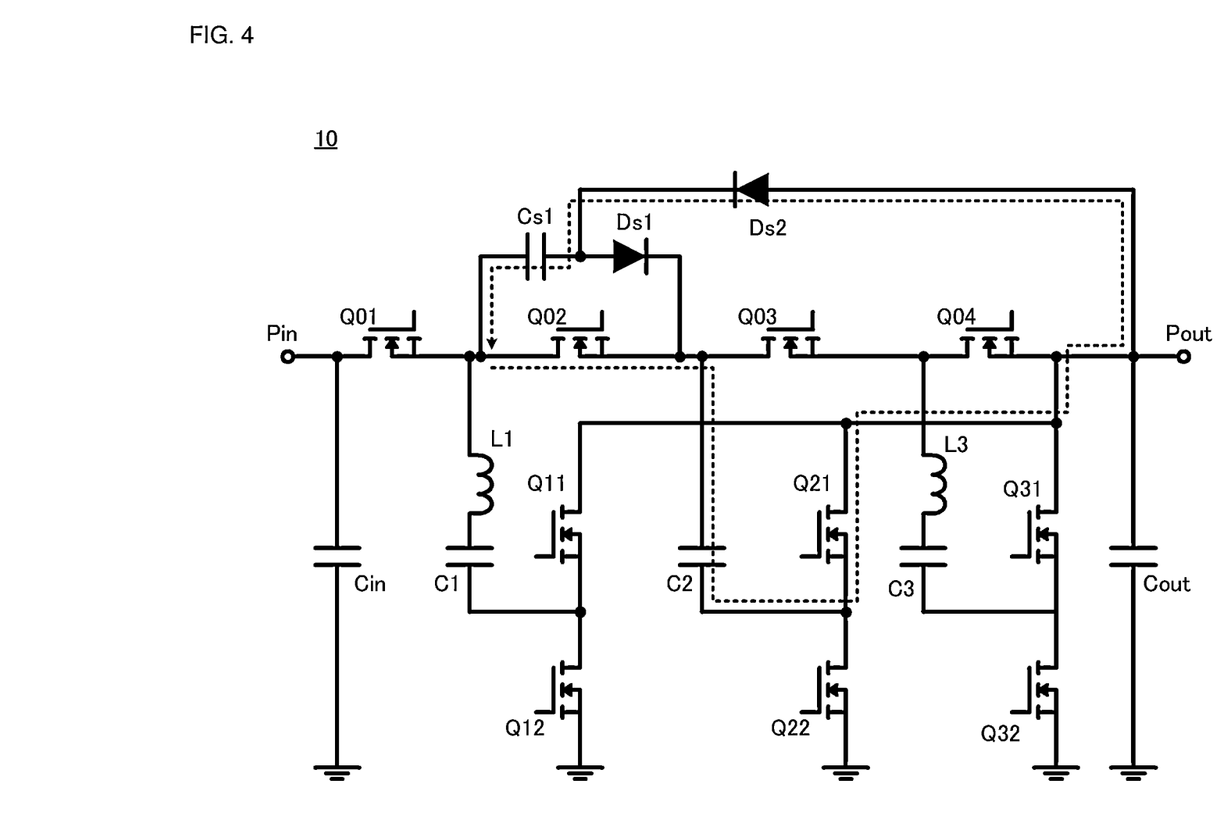
FIG. 4 is a diagram illustrating the flow of the surge current in a state 2 of the charge pump in the first preferred embodiment of the present invention.

FIG. 3 is a diagram illustrating the flow of surge current in the state 1 of the charge pump in the first preferred embodiment. FIG. 4 is a diagram illustrating the flow of the surge current in the state 2 of the charge pump in the first preferred embodiment.

In the state 1, the surge current caused by the switching of the switch Q02 flows through a loop including the capacitor C2, the switch Q22, the ground line, the capacitor Cin, the switch Q01, the capacitor Cs1, and the diode Ds1, as illustrated by a broken-line arrow in FIG. 3. In other words, in the state 1, the surge current of the switch Q02 circulates into the snubber circuit 20 through the intermediate-stage capacitor and the switching circuit, a capacitor Cin and the first-stage switch to flow through the capacitor Cs1.

In the state 2, the surge current caused by the switching of the switch Q02 flows through a loop including the capacitor C2, the switch Q21, the connection line between the switch Q04 and the output terminal Pout on the power line, the diode Ds2, the capacitor Cs1, and the switch Q02, as illustrated by a broken-line arrow in FIG. 4. In other words, in the state 2, the surge current of the switch Q02 circulates into the snubber circuit 20 through the intermediate-stage capacitor and the switching circuit, and the power line to flow through the capacitor Cs1.

As described above, flowing of the surge current through the capacitor Cs1 in the snubber circuit 20 reduces or prevents surge voltage.

Figure 5:
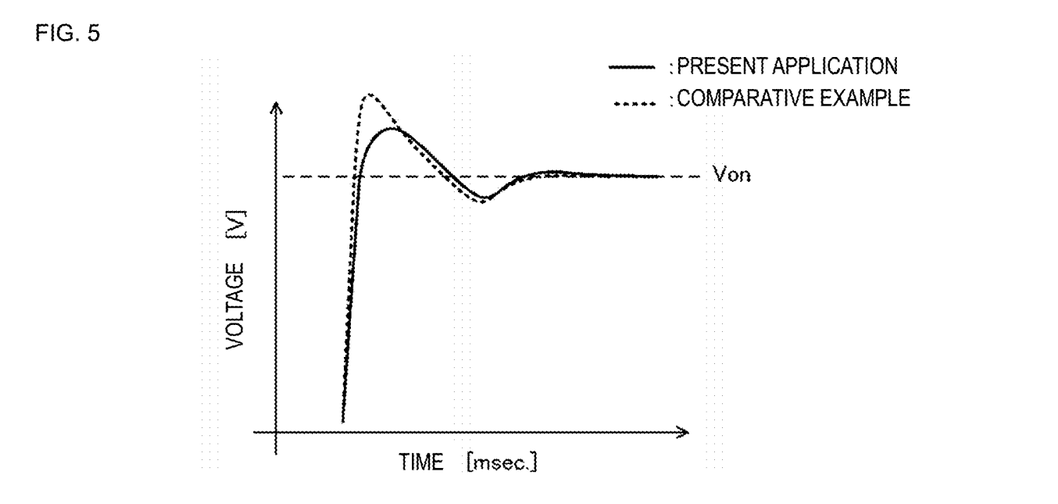
FIG. 5 is a graph indicating the waveform of voltage of a switch when switching from the state 1 to the state 2.

FIG. 5 is a graph indicating the waveform of the voltage of the switch Q02 when switching from the state 1 to the state 2. Referring to FIG. 5, a solid line indicates the waveform in this application and a broken line indicates the waveform in a comparative example. The comparative example indicates a case in which the snubber circuit 20 is not included in the configuration of this application.

As illustrated in FIG. 5, providing the charge pump 10 with the above-described configuration enables an increase in instantaneous voltage in the switching to be reduced or prevented. In other words, the charge pump 10 is capable of reducing or preventing the surge voltage.

In addition, the breakdown voltage of the switch Q02 is reduced in the charge pump 10.

Furthermore, the series circuit of the capacitor Cs1 and the diode Ds1 in the snubber circuit 20 is connected in parallel between the drain and the source of the switch Q02 in the charge pump 10. The cathode of the diode Ds1 is connected to the source of the switch Q02 and the anode of the diode Ds1 is connected to the drain of the switch Q02 via the capacitor Cs1.

In the above configuration, the current of a resonant frequency, which is caused by the switching between the state 1 and the state 2, mainly flows through the switch Q02 and a portion of the current shunts to the snubber circuit 20 side. This reduces or prevents the peak current of the resonance flowing through the switch Q02. Accordingly, it is possible to reduce the current load (burden) of the switch Q02 to achieve long life and so on of the switch Q02.

As described above, the snubber circuit 20 is connected to the switch Q02. However, the snubber circuit 20 can be connected to, for example, the switch Q03, as illustrated in FIG. 6.

Figure 6:
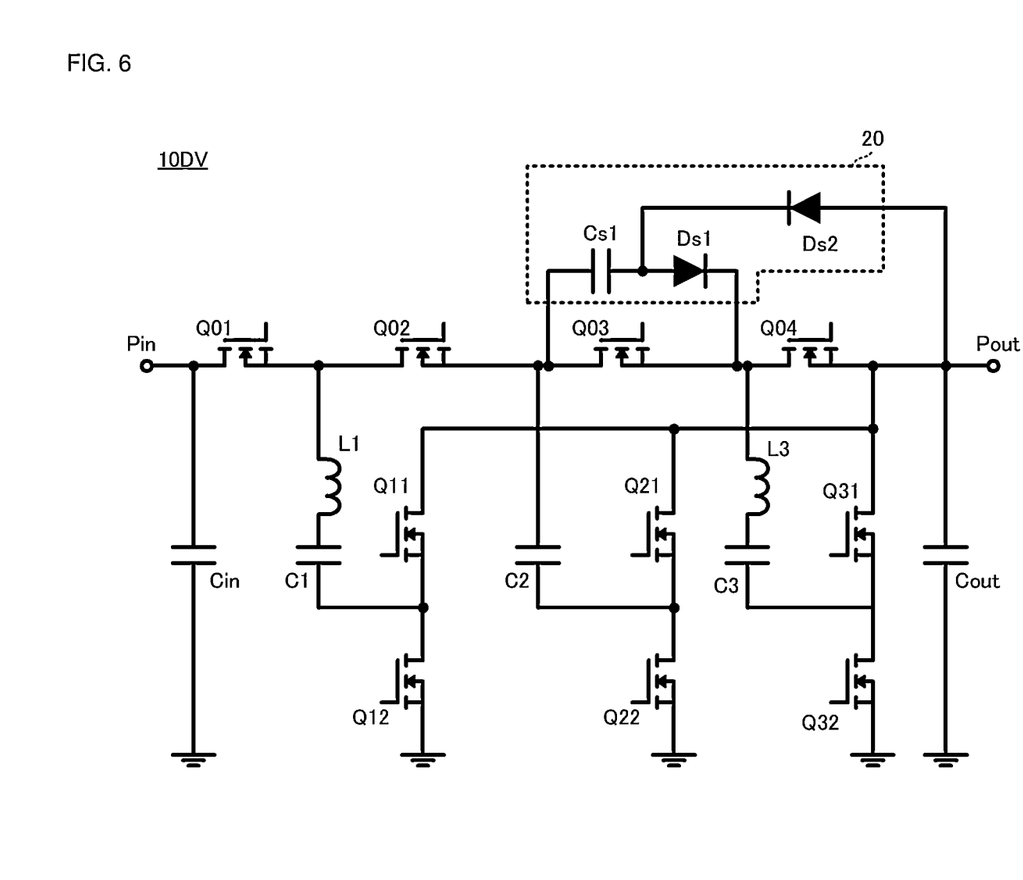
FIG. 6 is a derived circuit diagram of the charge pump according to the first preferred embodiment of the present invention.

FIG. 6 is a derived circuit diagram of the charge pump according to the first preferred embodiment. As illustrated in FIG. 6, the snubber circuit 20 is connected to the switch Q03 in a charge pump 10DV.

With this configuration, the charge pump 10DV is capable of reducing or preventing the surge voltage caused by the switching operation of the switch Q03.

As described above, the present preferred embodiment is applicable to a configuration in which the snubber circuit is connected to the intermediate-stage switch. Accordingly, the charge pump 10 is capable of reducing or preventing the surge voltage caused by the intermediate-stage switch. In addition, a switch having low breakdown voltage is able to be used as the intermediate-stage switch.

Second Preferred Embodiment

Figure 7:
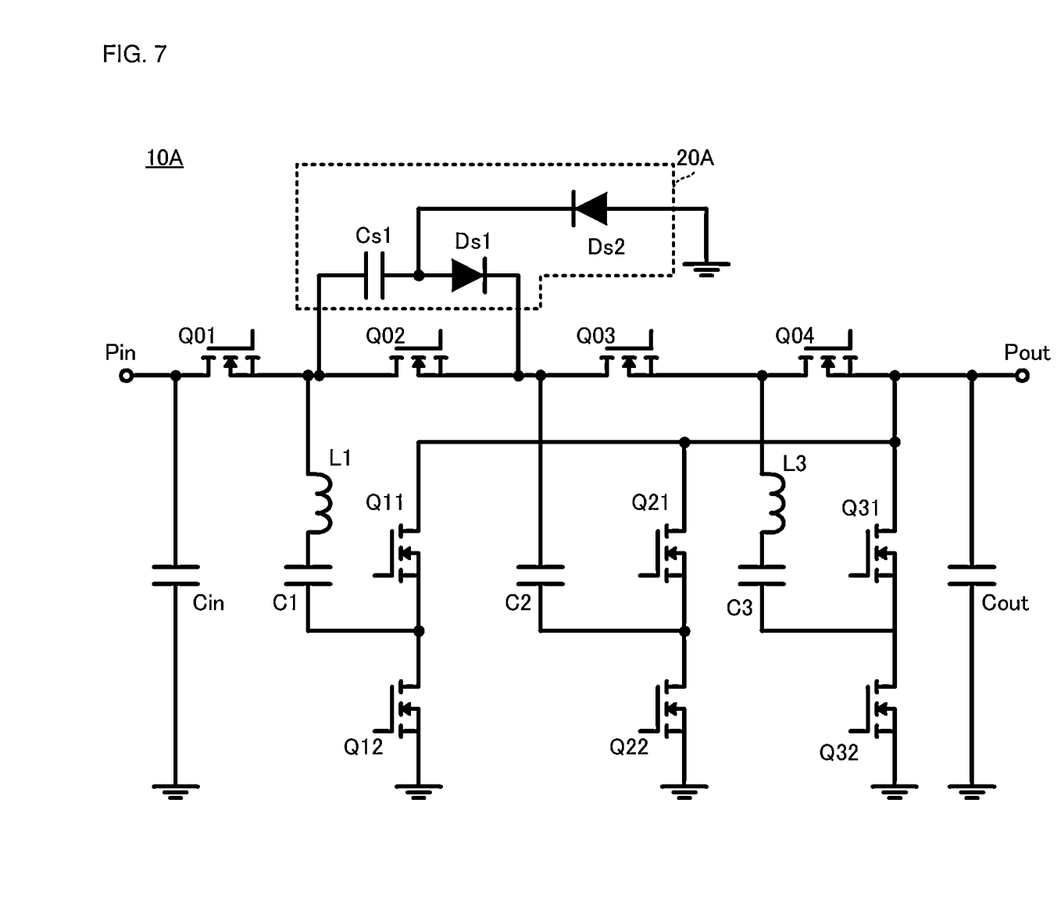
FIG. 7 is a circuit diagram of a charge pump according to a second preferred embodiment of the present invention.

A charge pump according to a second preferred embodiment of the present invention will now be described with reference to the drawings. FIG. 7 is a circuit diagram of the charge pump according to the second preferred embodiment.

As illustrated in FIG. 7, a charge pump 10A according to the second preferred embodiment differs from the charge pump 10 according to the first preferred embodiment in a connection of a snubber circuit 20A to another circuit. The remaining configuration of the charge pump 10A is the same or substantially the same as that of the charge pump 10 and a description of the same or similar points is omitted herein.

The charge pump 10A includes the snubber circuit 20A. The snubber circuit 20A includes the capacitor Cs1, the diode Ds1, and the diode Ds2. The snubber circuit 20A differs from the snubber circuit 20 according to the first preferred embodiment in the connection of the diode Ds2.

The cathode of the diode Ds2 is connected to a node between the capacitor Cs1 and the diode Ds1. The anode of the diode Ds2 is connected to the ground potential (the ground line).

Flow of Surge Current

Figure 8:
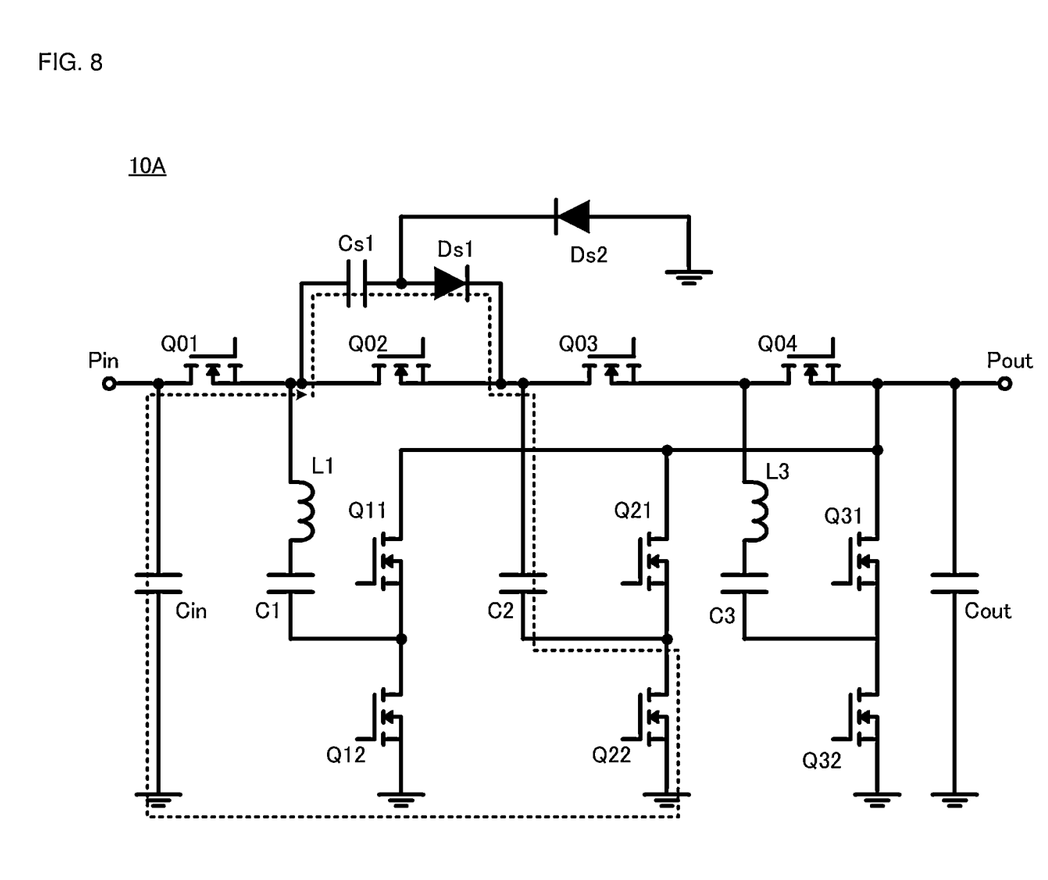
FIG. 8 is a diagram illustrating the flow of the surge current in the state 1 of the charge pump in the second preferred embodiment of the present invention.
Figure 9:
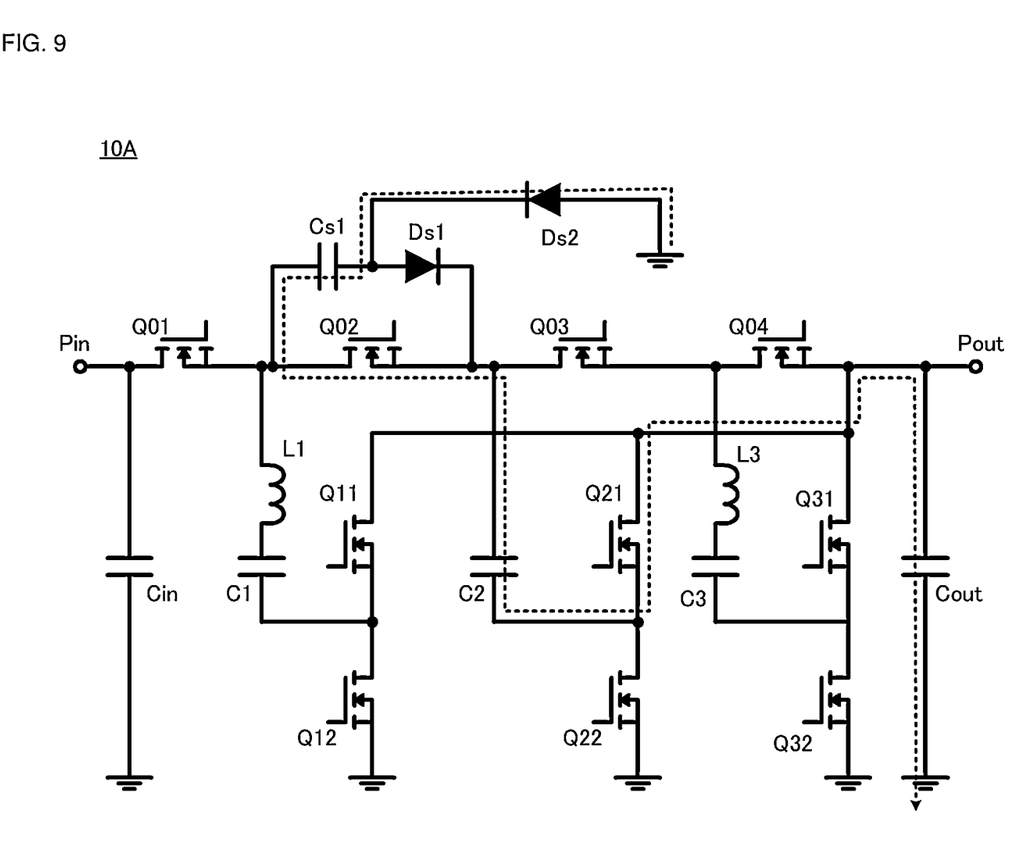
FIG. 9 is a diagram illustrating the flow of the surge current in the state 2 of the charge pump in the second preferred embodiment of the present invention.

FIG. 8 is a diagram illustrating the flow of the surge current in the state 1 of the charge pump in the second preferred embodiment. FIG. 9 is a diagram illustrating the flow of the surge current in the state 2 of the charge pump in the second preferred embodiment.

In the state 1, the surge current caused by the switching of the switch Q02 flows through a loop including the capacitor C2, the switch Q22, the ground line, the capacitor Cin, the switch Q01, the capacitor Cs1, and the diode Ds1, as illustrated by a broken-line arrow in FIG. 8. In other words, in the state 1, the surge current of the switch Q02 circulates into the snubber circuit 20A through the intermediate-stage capacitor and the switching circuit, the input capacitor, and the first-stage switch to flow through the capacitor Cs1.

In the state 2, the surge current caused by the switching of the switch Q02 flows through a loop including the capacitor C2, the switch Q21, the capacitor Cout, the ground line, the diode Ds2, the capacitor Cs1, and the switch Q02, as illustrated by a broken-line arrow in FIG. 9. In other words, in the state 2, the surge current of the switch Q02 circulates into the snubber circuit 20A through the intermediate-stage capacitor and the switching circuit, a final-stage capacitor (an output capacitor Cout), and the ground line to flow through the capacitor Cs1.

As described above, flowing of the surge current through the capacitor Cs1 in the snubber circuit 20A reduces or prevents the surge voltage.

Third Preferred Embodiment

Figure 10:
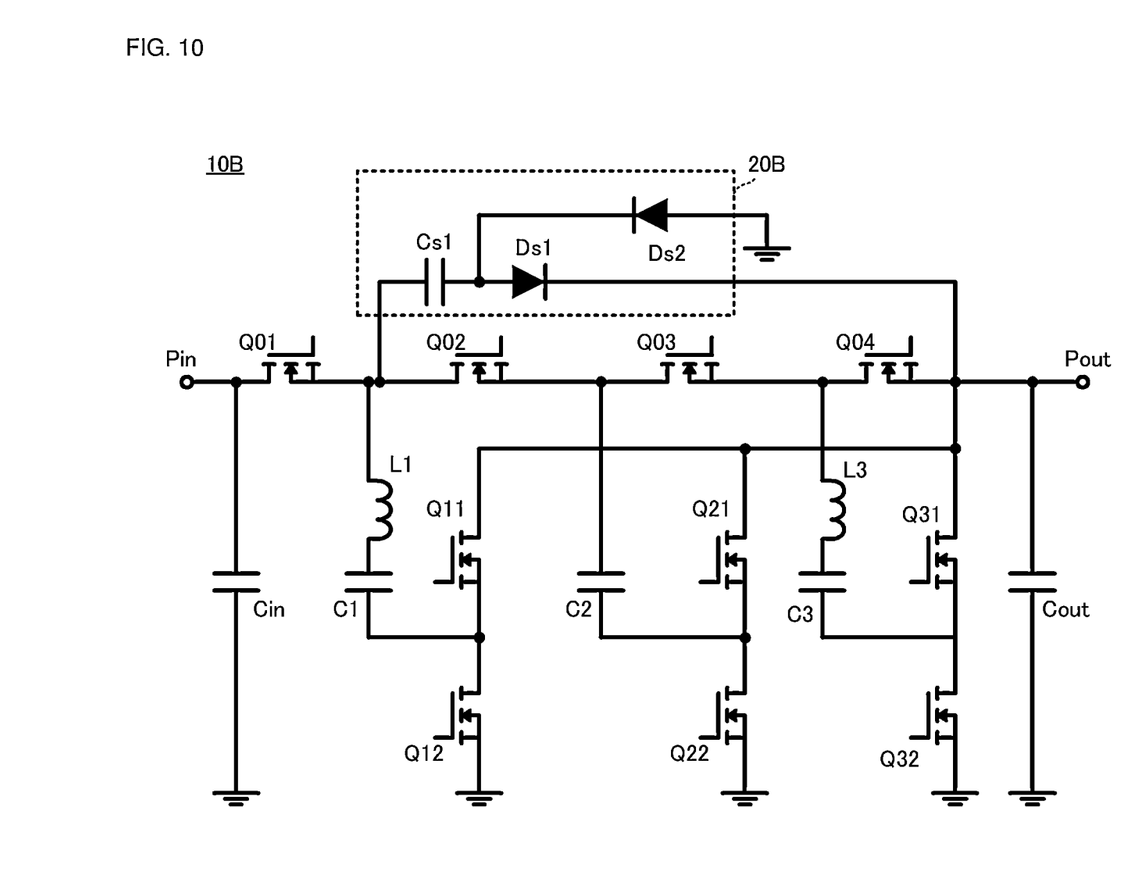
FIG. 10 is a circuit diagram of a charge pump according to a third preferred embodiment of the present invention.

A charge pump according to a third preferred embodiment of the present invention will now be described with reference to the drawings. FIG. 10 is a circuit diagram of the charge pump according to the third preferred embodiment.

As illustrated in FIG. 10, a charge pump 10B according to the third preferred embodiment differs from the charge pump 10 according to the first preferred embodiment in a connection configuration of a snubber circuit 20B to another circuit.

The remaining configuration of the charge pump 10B is the same or substantially the same as that of the charge pump 10 and a description of the same or similar points is omitted herein.

The charge pump 10B includes the snubber circuit 20B. The snubber circuit 20B includes the capacitor Cs1, the diode Ds1, and the diode Ds2. The snubber circuit 20B differs from the snubber circuit 20 according to the first preferred embodiment in the connection of the diodes Ds1 and Ds2.

Figure 11:
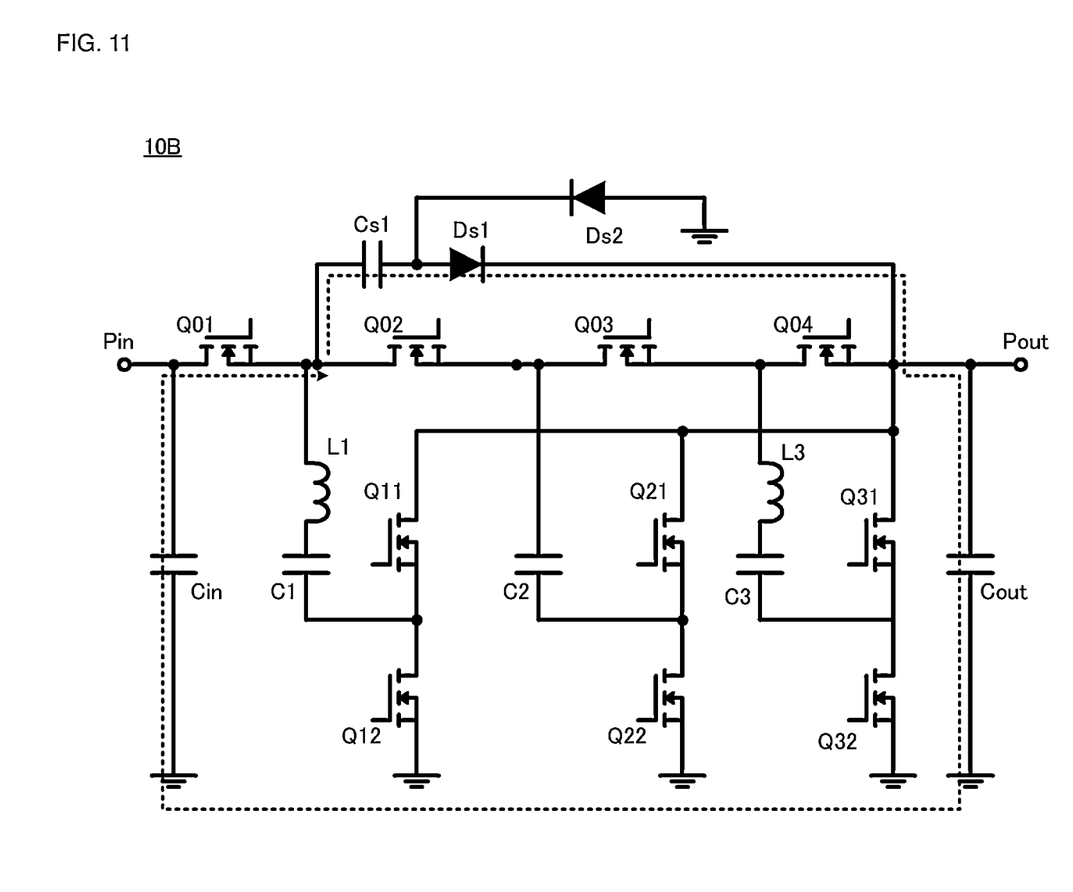
FIG. 11 is a diagram illustrating the flow of the surge current in the state 1 of the charge pump in the third preferred embodiment of the present invention.
Figure 12:
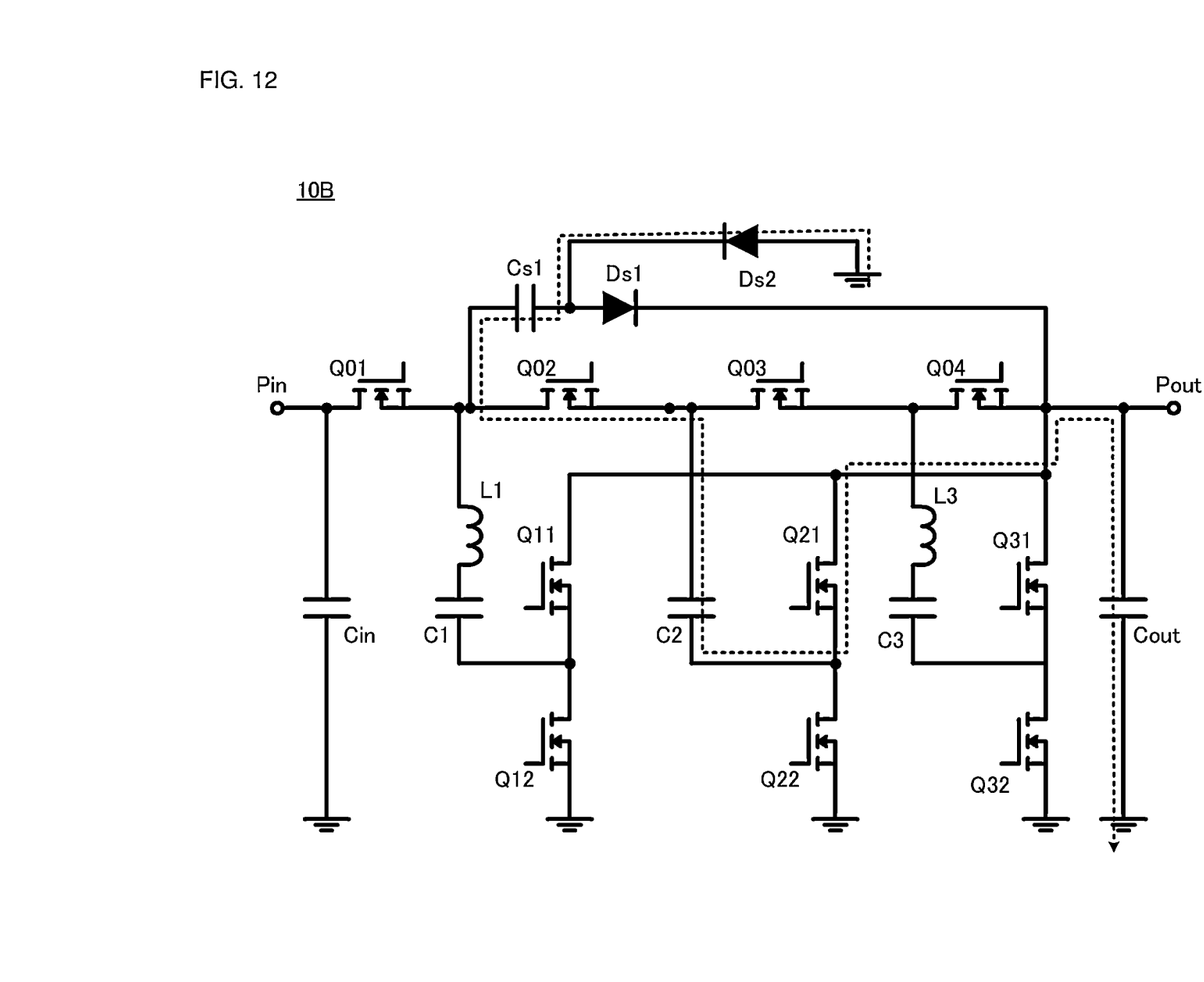
FIG. 12 is a diagram illustrating the flow of the surge current in the state 2 of the charge pump in the third preferred embodiment of the present invention.

The cathode of the diode Ds1 is connected to a node between the switch Q04 and the output terminal. The anode of the diode Ds2 is connected to the ground potential (the ground line). Flow of Surge Current FIG. 11 is a diagram illustrating the flow of the surge current in the state 1 of the charge pump in the third preferred embodiment. FIG. 12 is a diagram illustrating the flow of the surge current in the state 2 of the charge pump in the third preferred embodiment.

In the state 1, the surge current caused by the switching of the switch Q02 flows through a loop including the capacitor Cout, the ground line, the capacitor Cin, the switch Q01, the capacitor Cs1, and the diode Ds1, as illustrated by a broken-line arrow in FIG. 11. In other words, in the state 1, the surge current of the switch Q02 circulates into the snubber circuit 20B through the final-stage capacitor (the output capacitor), the input capacitor, and the first-stage switch to flow through the capacitor Cs1.

In the state 2, the surge current caused by the switching of the switch Q02 flows through a loop including the capacitor C2, the switch Q21, the capacitor Cout, the ground line, the diode Ds2, the capacitor Cs1, and the switch Q02, as illustrated by a broken-line arrow in FIG. 12. In other words, in the state 2, the surge current of the switch Q02 circulates into the snubber circuit 20B through the intermediate-stage capacitor and the switching circuit, the final-stage capacitor, and the ground line to flow through the capacitor Cs1.

As described above, flowing of the surge current through the capacitor Cs1 in the snubber circuit 20B reduces or prevents the surge voltage.

Fourth Preferred Embodiment

Figure 13:
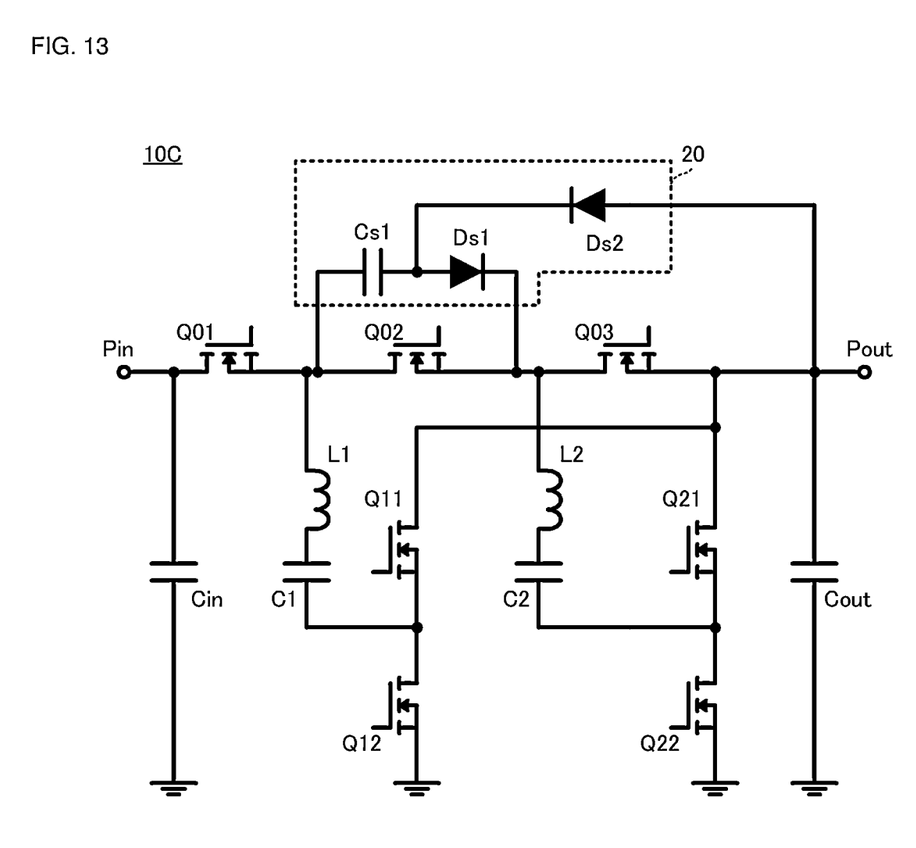
FIG. 13 is a circuit diagram of a charge pump according to a fourth preferred embodiment of the present invention.

A charge pump according to a fourth preferred embodiment of the present invention will now be described with reference to the drawing. FIG. 13 is a circuit diagram of the charge pump according to the fourth preferred embodiment.

As illustrated in FIG. 13, a charge pump 10C according to the fourth preferred embodiment differs from the charge pump 10 according to the first preferred embodiment in the number of stages. Specifically, the charge pump 10 according to the first preferred embodiment is a four-stage charge pump while the charge pump 10C according to the fourth preferred embodiment is a three-stage charge pump.

The basic configuration of the charge pump 10C is the same or substantially the same as that of the charge pump 10 except that the charge pump 10C differs from the charge pump 10 in the number of stages. A specific description of the connection of the respective circuit elements is omitted herein.

In this configuration, the switch Q01 is the first-stage switch, the switch Q02 is the intermediate-stage switch, and the switch Q03 is the final-stage switch.

In the charge pump 10C, the snubber circuit 20 is connected to the switch Q02 corresponding to the intermediate-stage switch.

With the above configuration, the charge pump 10C is capable of reducing or preventing the surge voltage, as in the charge pump 10.

Fifth Preferred Embodiment

Figure 14:
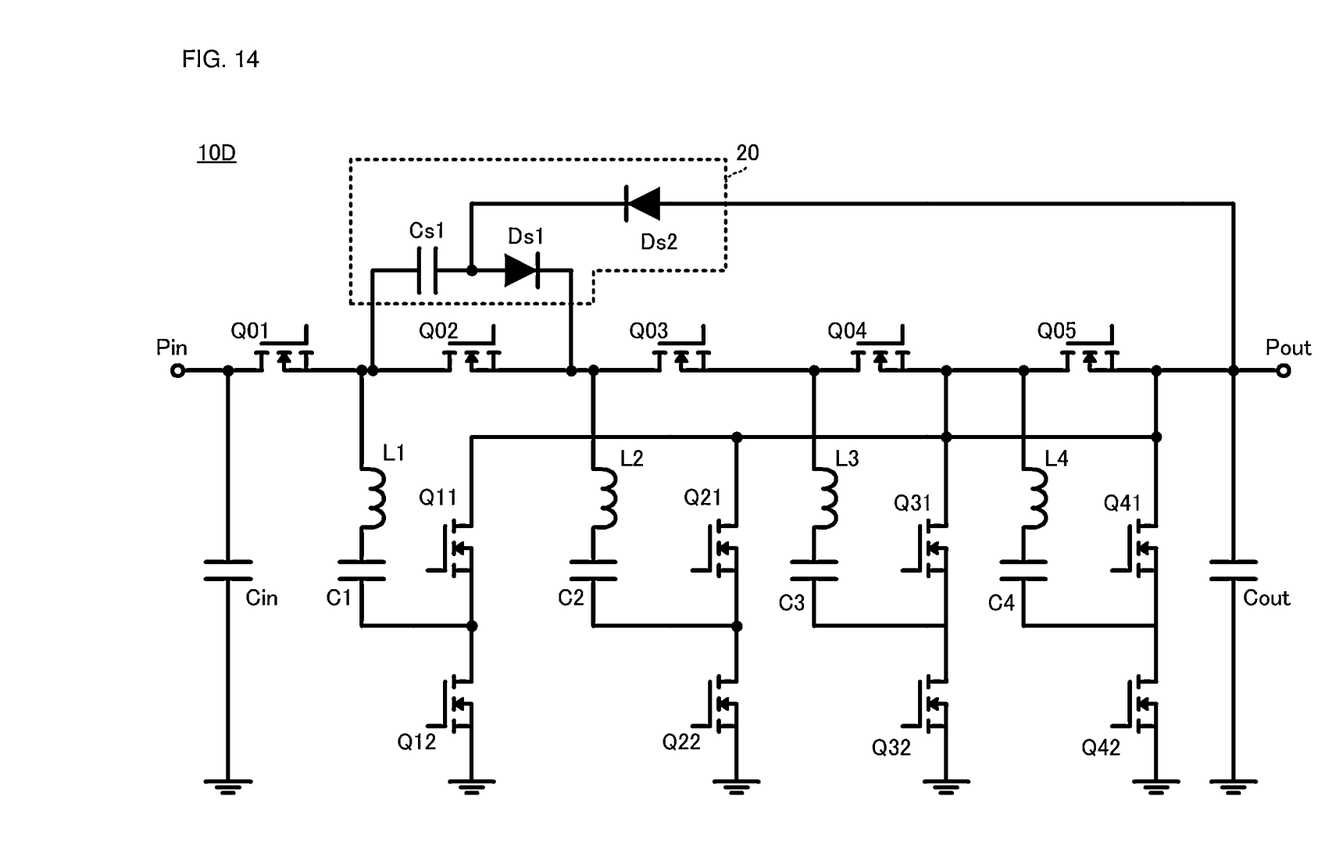
FIG. 14 is a circuit diagram of a charge pump according to a fifth preferred embodiment of the present invention.

A charge pump according to a fifth preferred embodiment of the present invention will now be described with reference to the drawing. FIG. 14 is a circuit diagram of the charge pump according to the fifth preferred embodiment.

As illustrated in FIG. 14, a charge pump 10D according to the fifth preferred embodiment differs from the charge pump 10 according to the first preferred embodiment in the number of stages. Specifically, the charge pump 10 according to the first preferred embodiment is the four-stage charge pump while the charge pump 10D according to the fifth preferred embodiment is a five-stage charge pump.

The basic configuration of the charge pump 10D is the same or substantially the same as that of the charge pump 10 except that the charge pump 10D differs from the charge pump 10 in the number of stages. A specific description of the aspect of connection of the respective circuit elements is omitted herein.

In this configuration, the switch Q01 is the first-stage switch, the switches Q02, Q03, and Q04 are the intermediate-stage switches, and the switch Q05 is the final-stage switch.

In the charge pump 10D, the snubber circuit 20 is connected to the switch Q02 corresponding to the intermediate-stage switch.

With the above configuration, the charge pump 10D is capable of reducing or preventing the surge voltage, as in the charge pump 10.

A configuration in which the snubber circuit 20 is connected to the switch Q03 or the switch Q04, instead of the switch Q02, is applicable in the charge pump 10D.

As described above, in preferred embodiments of the present invention, it is possible to reduce or prevent the surge voltage caused by the intermediate-stage switches regardless of the number of the intermediate-stage switches.

The configurations of the respective preferred embodiments described above can be appropriately combined and the effects and advantages corresponding to the respective combinations are achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A charge pump comprising:
   a first-stage capacitor, an intermediate-stage capacitor, and a final-stage capacitor sequentially connected in parallel to each other between a power line and a ground line from an input terminal side to an output terminal side;
   a first-stage switch connected between a node of the first-stage capacitor at the power line side and the input terminal;
   an intermediate-stage switch connected between the node of the first-stage capacitor at the power line side and a node of the intermediate-stage capacitor at the power line side;

a final-stage switch connected between the node of the intermediate-stage capacitor at the power line side and a node of the final-stage capacitor at the power line side;

a first-stage switching circuit to switch between a state in which the first-stage capacitor is connected to the ground line and a state in which the first-stage capacitor is connected to the output terminal;

an intermediate-stage switching circuit to switch between a state in which the intermediate-stage capacitor is connected to the ground line and a state in which the intermediate-stage capacitor is connected to the output terminal;

a final-stage switching circuit to switch between a state in which the final-stage capacitor is connected to the ground line and a state in which the final-stage capacitor is connected to the output terminal; and a snubber circuit connected in parallel to the intermediate-stage switch, including a snubber circuit capacitor connected to the input terminal side of the intermediate-stage switch to circulate a surge caused by a switching operation of the intermediate-stage switch via the snubber circuit capacitor.

2. The charge pump according to claim 1, wherein the snubber circuit includes:

a first rectifier connected in series to the snubber circuit capacitor to perform rectification from the input terminal side to the output terminal side; and a second rectifier connected to a node-in-snubber circuit between the snubber circuit capacitor and the first rectifier to perform rectification toward the node-in-snubber circuit.

3. The charge pump according to claim 2, wherein the first rectifier is connected to the output terminal side of the intermediate-stage switch; and the second rectifier is connected to the output terminal.

4. The charge pump according to claim 2, wherein the first rectifier is connected to the output terminal side of the intermediate-stage switch; and the second rectifier is connected to the ground line.

5. The charge pump according to claim 2, wherein the first rectifier is connected to the output terminal; and the second rectifier is connected to the ground line.

6. The charge pump according to claim 1, wherein a breakdown voltage of the intermediate-stage switch is lower than a breakdown voltage of the first-stage switch and a breakdown voltage of the final-stage switch.

7. The charge pump according to claim 2, wherein each of the first and second rectifiers is a diode.

8. The charge pump according to claim 1, wherein a plurality of the intermediate-stage switches are provided.

9. The charge pump according to claim 1, wherein each of the first-stage switch, the intermediate-stage switch, and the final-stage switch is a field effect transistor.

10. The charge pump according to claim 1, wherein the charge pump is a four-stage charge pump.

11. The charge pump according to claim 1, wherein the charge pump is a five-stage charge pump.

12. A three-stage charge pump comprising:

a first-stage capacitor, an intermediate-stage capacitor, and a final-stage capacitor sequentially connected in parallel to each other between a power line and a ground line from an input terminal side to an output terminal side;

a first-stage switch connected between a node of the first-stage capacitor at the power line side and the input terminal;

an intermediate-stage switch connected between the node of the first-stage capacitor at the power line side and a node of the intermediate-stage capacitor at the power line side;

a final-stage switch connected between the node of the intermediate-stage capacitor at the power line side and a node of the final-stage capacitor at the power line side;

a first-stage switching circuit to switch between a state in which the first-stage capacitor is connected to the ground line and a state in which the first-stage capacitor is connected to the output terminal;

an intermediate-stage switching circuit to switch between a state in which the intermediate-stage capacitor is connected to the ground line and a state in which the intermediate-stage capacitor is connected to the output terminal; and a snubber circuit connected in parallel to the intermediate-stage switch, including a snubber circuit capacitor connected to the input terminal side of the intermediate-stage switch to circulate a surge caused by a switching operation of the intermediate-stage switch via the snubber circuit capacitor.

* * * * *